United States Patent [19]

Furlan et al.

[11] Patent Number: 5,449,559
[45] Date of Patent: Sep. 12, 1995

[54] HIGH PERFORMANCE VINYL LAMINATING ADHESIVE

[75] Inventors: Wayne R. Furlan, Hellertown; Bruce A. Gruber, Emmaus, both of Pa.

[73] Assignee: Air Products and Chemicals, Inc., Allentown, Pa.

[21] Appl. No.: 187,883

[22] Filed: Jan. 27, 1994

[51] Int. Cl.[6] .......................... B32B 27/30; C08J 3/02; C08L 75/14

[52] U.S. Cl. ............................. 428/424.6; 428/424.4; 428/518; 428/520; 524/501; 524/507; 524/539; 524/563; 524/813

[58] Field of Search ............... 428/424.4, 424.6, 518, 428/520; 524/501, 507, 539, 563, 813

[56] References Cited

U.S. PATENT DOCUMENTS

| | | | |
|---|---|---|---|
| 4,921,898 | 5/1990 | Lenney et al. | 524/459 |
| 5,092,953 | 3/1992 | Derby et al. | 156/331.7 |
| 5,173,526 | 12/1992 | Vijayendran et al. | 524/457 |

FOREIGN PATENT DOCUMENTS 0346054 12/1989 European Pat. Off. .

*Primary Examiner*—D. S. Nakarani
*Attorney, Agent, or Firm*—Michael Leach; William F. Marsh

[57] ABSTRACT

A vinyl laminate comprising polyvinyl chloride film bonded to a substrate with an adhesive composition consisting essentially of (a) 50 to 95 wt % aqueous polyvinyl alcohol stabilized vinyl acetate/ethylene copolymer emulsion, (b) 5 to 50 wt % aqueous polyurethane-acrylic polymer dispersion, the weight percent based upon polymer solids, and optionally, (c) 3 to 15 wt % polyisocyanate material, the wt %'s based on components (a) and (b) solids.

18 Claims, No Drawings

025
HIGH PERFORMANCE VINYL LAMINATING ADHESIVE

TECHNICAL FIELD

This invention relates to water-based adhesive compositions containing a polyvinyl alcohol (PVOH) stabilized vinyl acetate/ethylene (VAE) copolymer emulsion.

BACKGROUND OF THE INVENTION

The vinyl laminating market comprises three major segments, namely the mobile home, furniture and paneling markets. The industry requirements for a high performance vinyl laminating adhesive are based on many requirements, but three primary standards are the following:

cross-hatch shrinkage—maximum movement of 0.0254 mm at 93° C.

lap sheer—no vinyl creep with a 1.8 kg weight at 71°-93° C.

peel adhesion—3 to 7 pli (0.53 to $1.23 \times 10^{-3}$ N/m).

Current technology used in the industry comprises two-part epoxy systems and isocyanate crosslinked VAE copolymer emulsions. Industry trends indicate attempts to move away from two-part epoxy systems due to their poor wet tack during application, long cure time, high cost and health issues. The VAE copolymer emulsion technology as been unable to achieve the high temperature requirements of the cross-hatch shrinkage and lap sheer tests. The addition of 5 pph aromatic isocyanate to a VAE copolymer emulsion has made headway into the market with improvements in heat resistance. However, this system has not be able to consistently meet the performance requirements of the cross-hatch shrinkage and lap sheer tests or duplicate the performance of the epoxy.

U.S. Pat. No. 4,921,898 discloses a VAE copolymer emulsion which is about 65–75% solids and has a viscosity of less than about 3,500 cps. The emulsion is prepared by copolymerization of vinyl acetate and ethylene monomers in the presence of a stabilizing system, consisting essentially of 2–4 wt % PVOH having a 100–600 degree of polymerization and 2–4 wt % of a surfactant.

U.S. Pat. No. 5,092,953 discloses a water-based adhesive composition comprising a PVOH stabilized vinyl chloride-ethylene copolymer latex and 5–50 wt %, based on copolymer, of a polyisocyanate material. The adhesive composition has improved pot life and is used to prepare wood composites demonstrating improved water resistance.

U.S. Pat. No. 5,173,526 discloses a method for making an aqueous polyurethane-vinyl polymer dispersion.

SUMMARY OF THE INVENTION

The present invention provides a vinyl laminating adhesive composition consisting essentially of:
(a) 50–95 wt % aqueous polyvinyl alcohol (PVOH)-stabilized vinyl acetate/ethylene (VAE) copolymer emulsion; and
(b) 5–50 wt % aqueous polyurethane-acrylic (UA) polymer dispersion, the wt %'s based on polymer solids.

In a preferred embodiment the VAE/UA adhesive composition is blended with 3 to 15 wt % polyisocyanate, based on VAE/UA solids.

A particular embodiment of the invention comprises a polyvinyl chloride (PVC) film bonded to a substrate, preferably wood, with the above VAE/UA adhesive composition.

The VAE/UA adhesive composition can be used to laminate PVC to particle board, lauan and other porous substrates for ceiling and wall vinyl laminates. The resulting vinyl laminates demonstrate high heat resistance (77°–93° C.) when used in ceiling and wall applications. In addition, these laminates pass the 1.8 kg creep performance specification. The aqueous VAE/UA adhesive compositions demonstrate an unlimited pot life with no viscosity change over time.

In the VAE/UA adhesive composition containing a polyisocyanate, the resulting final laminates also demonstrate high heat resistance (77°–93° C.) when used in ceiling and wall applications, as well as passing the 1.8 kg creep performance specification. In addition, there is improved peel adhesion of 8–10 pli (1.40–$1.75 \times 10^{-3}$ N/m). The polyisocyanate containing adhesive composition is capable of meeting the cross-hatch test at 93° C. on a wide variety of PVC and porous substrates and demonstrates a useable pot life of between 6–8 hours without increase of viscosity.

DETAILED DESCRIPTION OF THE INVENTION

The present invention provides a vinyl laminating adhesive composition for bonding a PVC film to a porous substrate. The adhesive composition consists essentially of:
(a) 50–95 wt %, preferably 70 to 95 wt %, aqueous PVOH stabilized VAE copolymer emulsion;
(b) 5–50 wt %, preferably 5 to 30 wt %, aqueous UA dispersion, and optionally; but preferably
(c) 3 to 15 wt %, preferably 5 to 10 wt % polyisocyanate material, the wt %'s based on (a) and (b) polymer solids.

The above polymeric adhesive composition may comprise 40–70 wt %, preferably 50–65 wt %, of the aqueous adhesive composition.

A VAE copolymer emulsion suitable for use in the present PVC laminating adhesive composition comprises a copolymer that is 70–85 wt % vinyl acetate and 15–30 wt % ethylene and has a Tg of about −20° to +10° C. Preferably, the copolymer contains 75–80 wt % vinyl acetate and 20–25 wt % ethylene.

While the VAE copolymer emulsion could comprise at least 40 wt % polymer solids, it is preferred that the amount of vinyl acetate and ethylene monomers used in the emulsion polymerization be such that the resulting emulsion is at least 55–70%, solids, more preferably 60–67% solids.

The VAE copolymers may optionally include one or more additional ethylenically unsaturated copolymerizable monomers at up to 10 wt % or more, preferably about 2–5 wt %.

Most advantageously, the VAE copolymer is prepared by the aqueous emulsion polymerization of the vinyl acetate and ethylene monomers in the presence of a PVOH suspending system. The PVOH stabilizing system used in the polymerization reaction preferably is added to the reaction all at once prior to initiation, but may be added incrementally during the course of polymerization, provided a sufficient amount is present initially to provide emulsion stability.

The stabilizing system for preparing the preferred VAE copolymer emulsions of the PVC laminate adhesive composition consists essentially of 2-5 wt % PVOH and 0.3-4 wt % nonionic polyalkoxylated surfactant. These wt % ranges are based on vinyl acetate monomer. The PVOH which is used in the stabilizing system is 75-99 mole % hydrolyzed, preferably 86-88 mole % hydrolyzed and has a degree of polymerization ranging from 100-600 i.e., a low molecular weight PVOH. High molecular weight PVOH's may be included, provided the requisite lower molecular weight PVOH is present.

The PVOH component of the stabilizing system may consist essentially of a mixture of a 98-99 mole % hydrolyzed (fully) PVOH and 86-90 mole % hydrolyzed, preferably 86-88 mole % hydrolyzed, (partially) PVOH. The fully and partially hydrolyzed PVOH's should have a degree of polymerization ranging from 100-600, although small amounts of PVOH having a higher degree of polymerization can also be present. The relative amount of each type of PVOH used in such a mixture should be in the range of 3:1 to 1:3 weight ratio of fully hydrolyzed PVOH to partially hydrolyzed PVOH, desirably at a 1:1 weight ratio.

In addition to the PVOH component, the stabilizing system also contains a nonionic polyoxyethylene condensate surfactant (polyethoxylated surfactant) in an amount ranging from 0.3-4 wt % based on vinyl acetate. The nonionic surfactant is ideally a polyethoxylated derivative of an alkyl phenol or a hydrophobic base formed by condensing propylene oxide with propylene glycol. Most advantageously, the surfactants contain up to about 40 ethylene oxide units, especially about 30 ethylene oxide units.

In general, suitable VAE copolymer emulsions can be prepared by copolymerization of the monomers in the presence of the PVOH stabilizing system by aqueous emulsion polymerization techniques well known in the art. U.S. Pat. Nos. 3,661,696; 3,734,819 and 3,769,151 show the preparation of VAE copolymer emulsions using a PVOH-nonionic surfactant stabilizing system at solids content of 60% and more. U.S. Pat. No. 4,921,898 discloses a method for making the preferred PVOH stabilizing VAE copolymer emulsions of at least 60 wt % solids, suitable for practicing the present invention. A 66 wt % VAE emulsion is commercially available from Air Products and Chemicals, Inc. as Airflex ® 465 emulsion.

In addition to the VAE copolymer emulsion, the aqueous PVC laminating adhesive composition also contains an aqueous UA polymer dispersion. It is preferred that the UA polymer possess a 100% tensile modulus of <1500 psi (<10.34 N/m$^2$), preferably <1000 psi (<6.9 N/m$^2$), and an elongation of >500%, preferably >600%. These properties can be controlled by the type and relative amounts of polyisocyanate, polyol and acrylic monomer(s) used to prepare the UA polymer. Suitable UA polymer dispersions may be prepared according to the teachings in any of the following patents: U.S. Pat. Nos. 3,684,758; 3,705,164; 4,198,330; 4,644,030; 5,173,526 and EP 0 308 115 A2. Preferably, the aqueous UA polymer dispersion is prepared according to the teachings in U.S. Pat. No. 5,173,526 by:

(a) forming a carboxy-containing, water-dispersible, isocyanate-terminated polyurethane prepolymer;
(b) adding a vinyl monomer mixture which contains a polyethylenically unsaturated monomer to the prepolymer to make a prepolymer/monomer mixture;
(c) adding a tertiary amine to the prepolymer/monomer mixture;
(d) dispersing the prepolymer/monomer mixture in water;
(e) adding an oil-soluble free radical initiator and a chain extender to the aqueous dispersion; and
(f) polymerizing the vinyl monomers and completing the chain-extension of the prepolymer by heating the aqueous dispersion.

The isocyanate-terminated polyurethane prepolymers are commonly produced by reacting organic material containing an average of at least about two active hydrogen atoms per molecule, usual a diol and preferably a polyester polyol, with a stoichiometric excess of an organic diisocyanate. Preferably, a suitable proportion of the organic material also contains, as means for providing anionic water dispersibility to the prepolymer, at least one comparatively unreactive pendant carboxylic group which is neutralized with a tertiary amine to the salt form after the prepolymer formation and addition of the monomers, but before the formation of the aqueous dispersion.

The polyisocyanates used in making the prepolymer may be an aliphatic, cycloaliphatic, aliphatic or aromatic polyisocyanate. Examples of suitable polyisocyanates include ethylene diisocyanate, 1,6-hexamethylene diisocyanate, isophorone diisocyanate, hexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate.

Polymeric polyols having molecular weights in the range of 500 to 6,000 which may be used in the preparation of the prepolymer, particularly include diols and triols and mixtures thereof, but higher functionality polyols may also be used, for example, as minor components in admixture with diols. The polyols may be members of any of the chemical classes of polymeric polyols used or proposed to be used in polyurethane formulations. In particular, the polyols may be polyesters, polyesteramides, and polyethers. Preferred polyol molecular weights are from 700 to 3,000. The polyester polyols and polyether polyols are those polyols well known in the polyurethane art.

Isocyanate-reactive compounds containing acid groups which may be used in the preparation of the anionic water-dispersible prepolymers include carboxy group containing diols and triols, for example, dihydroxyalkenoic acids of the formula

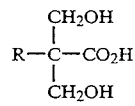

wherein R is hydrogen or a $C_1$-$C_{10}$ alkyl group. The preferred carboxy-containing diol is 2,2-dimethylolpropionic acid. If desired, the carboxy-containing diol or triol may be incorporated into a polyester by reaction with a dicarboxylic acid before being incorporated into the prepolymer.

The anionic water-dispersible, isocyanate-terminated polyurethane prepolymer may be prepared in conventional manner by reacting a stoichiometric excess of the organic polyisocyanate with the polymeric polyol and any other required isocyanate-reactive compounds under substantially anhydrous conditions at a temperature between about 30° and 130° C. until the reaction between the isocyanate groups and the hydroxyl groups is substantially complete. The polyisocyanate and the active hydrogen-containing components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

A mixture of the of the carboxy-containing water-dispersible polyurethane prepolymer and vinyl monomer is produced by simply adding a vinyl monomer composition to the prepolymer. In the preferred method the final monomer composition must contain a polyethylenically unsaturated comonomer.

Suitable vinyl monomers which may be combined with the prepolymer include ethylenically unsaturated hydrocarbons, esters and ethers, especially esters of acrylic and methacrylic acids, esters of vinyl alcohol and styrene. Specific examples include butadiene, isoprene, styrene, substituted styrenes, the lower alkyl $C_1$-$C_6$ esters of acrylic, methacrylic and maleic acids, vinyl acetate and butyrate, acrylonitrile, vinylmethyl, propyl and butyl ethers, vinyl chloride, vinylidene chloride, and the like. Suitable polyethylenically unsaturated monomers include butadiene, isoprene, allylmethacrylate, diacrylate esters of $C_2$-$C_6$ diols, such as butane diol diacrylate and hexane diol diacrylate, divinylbenzene, divinylether, divinylsulfide, trimethylolpropane, triacrylate, and the like.

Prior to dispersing the prepolymer/monomer mixture in water, a tertiary amine is added to the mixture in an amount sufficient to render the prepolymer water dispersible, i.e., an amount sufficient to substantially neutralize the carboxylic functionality as is well known in the art. Suitably, the amine is added at about 65 to 100% amine equivalent of carboxy functionality. It is preferred to add the amine until the dihydroxyalkenoic acid is about 80% neutralized.

Tertiary amines that may be used in the practice of the invention are relatively volatile so that they evaporate from the coating upon curing. Examples would include amines of the formula

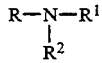

wherein R, $R^1$ and $R^2$ are independently $C_1$-$C_4$ alkyl and hydroxylalkyl groups. Illustrative of such tertiary amines are triethylamine, dimethylethanolamine, methyldiethanolamine, and methyldiethylamine.

It is important that the tertiary amine be added to the prepolymer/monomer mixture before the mixture is dispersed in water to insure compatibility of the organic and aqueous phases in the resulting dispersion. To also enhance the compatibility of the organic and aqueous phases, a small quantity of a polar organic liquid such as N-methylpyrrolidone can be added in amounts ranging from 1 to 12 wt %, preferably 3-6 wt % of the final UA polymer dispersion.

The prepolymer/vinyl monomer mixture may be dispersed in water using techniques well known in the art. Preferably, the mixture is added to the water with agitation or, alternatively, water may be stirred into the mixture.

The active hydrogen-containing chain extender which is reacted with the prepolymer is suitably a polyol, an amino alcohol, ammonia, a primary or secondary aliphatic, alicyclic, aromatic, aliphatic or heterocyclic amine, especially a diamine.

The free radical initiator should be an oil soluble material, meaning a free radical generating material that preferentially partitions into the organic phase compared to the aqueous phase, i.e., not substantially soluble in the aqueous phase. Suitable oil soluble free radical initiators would include the azo-type initiators such as 2,2'-azobis(2,4-dimethyl-pentanenitrile) and 2,2'-azobis(2-methylpropanenitrile) [AIBN]. Redox systems comprising reducing agents and oxidizing agents (free radical initiators) as are well known in the polymerization art can also be used, but the free radical initiator must be oil soluble.

The free radical polymerization of the monomer mixture and the chain extension of the prepolymer is conducted at an elevated temperature, namely, a temperature sufficient to liberate free radicals at a rate that sustains the polymerization reaction and to complete chain extending the prepolymer since the chain extending reaction begins to proceed upon the addition of the chain extender to the aqueous dispersion. A suitable temperature would be 50° to 90° C., preferably 60° to 80° C.

The amount of chain extender employed should be approximately equivalent to the free isocyanate groups in the prepolymer, the ratio of nitrogen atoms containing active hydrogens in the chain extender to isocyanate groups in the prepolymer, preferably being in the range of from 0.7 to 1.3:1. Of course, when water is employed as a chain extender, these ratios will not be applicable since the water, functioning as both the chain extender and dispersing medium, will be present in the gross excess relative to the free isocyanate groups.

Polymerization of the vinyl monomers may be effected by one of two methods.

In the first method, the monomers are added and may swell the polyurethane prepolymer before the tertiary amine is added. The monomers are then polymerized using the oil soluble free radical initiator. The proportion of monomers used, based on total solids in the resulting dispersion, is suitably from 25 to 75%, preferably from 40 to 60%.

In the second method, polymerization of the vinyl monomers involves initially adding a portion of the monomers to the prepolymer, neutralizing with tertiary amine and dispersing the prepolymer/monomer mixture in water followed by polymerization during which additional monomers (the same or different) are added during the polymerization process. Alternatively, the second portion of the monomer composition can be added to the prepolymer/monomer dispersion after amine addition and equilibrated by stirring before the polymerization is begun. The polymer dispersions obtained can comprise 20 to 60 wt % solids.

Preferably, the aqueous VAE/UA adhesive composition also contains about 3-15 parts by weight, preferably 5-10 parts, polyisocyanate per 100 parts by weight of VAE and UA polymer solids.

The polyisocyanate material should be dispersible in the aqueous VAE/UA adhesive composition such that at least a 6-8 hour dispersion stability is achieved. Stability beyond about 8 hours is not necessary since the adhesive composition would be in almost all instances used within six hours of preparation. The polyisocyanate material should have a functionality of >2, preferably >2.5, ideally about 2.8. Polyisocyanates which are either non-dispersible or dispersible in water can suitably be used. Illustrative of suitable non-dispersible polyisocyanates are standard polymeric diphenylmethane diisocyanate (PMDI) such as PAPI-27, PAPI-135 and Mondur MR brands commercially available from Dow Chemical and Mobay. Suitable solvent-free, water dispersible polyisocyanate materials include those taught in U.S. Pat. No. 4,433,095 and those materials commercially available from ICI Americas, Inc., such as Rubinate MF-178, Rubinate PBA-2259 and Rubinate PBA-2236 polyisocyanates, which are emulsifiable blends of diphenylmethane diisocyanate (MDI) and PMDI. U.S. Pat. No. 3,996,154 discloses suitable solvent-free dispersible organic isocyanates.

The PVC laminating adhesive compositions of the present invention are prepared simply by blending the appropriate amounts of an aqueous PVOH stabilized VAE copolymer emulsion and a UA polymer dispersion to which, optionally, but preferably, is added the polyisocyanate material.

The amount of the aqueous adhesive composition for bonding the PVC to the substrate would be that amount sufficient to effect a laminating bond and would comprise about 1 to 5 mils (0.0254 to 0.127 mm), preferably 2 to 4 mils (0.051 to 0.102 mm). The PVC films used in making the laminates would have a thickness ranging from 4 to 12 mils (0.102 to 0.305 mm). Suitable substrates include those porous substrates such as lauan, particle board, MFD board and plywood. The laminates can prepared by roll laminating as is well known in the art.

In the following examples, the PVC laminate adhesion testing was evaluated by the following performance tests.

180° Creep Test—PVC is bonded to porous substrate such as desized popolin cloth or lauan panel. The adhesive composition is applied with a wire wound rod #60 (50–60 mil wet film thickness). After seven days' cure, the samples are cut to a 2.54 cm width and 15.24 cm length. The panel is suspended in an air circulating oven at 76° to 96° C. A 100 to 500 g weight is suspended at the end of the vinyl. The panels are allowed to creep to approximately 50% of the length of the panel. The distance traveled and the time are recorded and reported as mm/min.

45° Lap Shear 71°–93° C.—a 15.24×15.24 cm PVC to lauan panel is laminated using a #60 rod and allowed to cure for seven days. The panel is positioned at a 45° angle on a test jig that is in an air circulating oven. A 1.8 kg steel weight with a 2.54×5.08 cm contact angle that is cut at a 45° angle is covered with a heat-resistant contact adhesive. The steel weight is then pressed onto the center of the panel and subjected to the stress for 24 hours. The PVC below the edge of the weight is inspected for wrinkling and delamination, which is considered a failure.

PVC Shrinkage—a 15.24×15.24 cm PVC to lauan panel is laminated using a #60 rod and allowed to cure for seven days. A razor blade is used to cut two diagonal scribes across the midsection of the PVC and the lauan panel. The sample is conditioned at 93° C. for 24 hours in an air circulating oven. Panels are then allowed to come to room temperature and inspected with a 10X power microscope with microscope table gauge slide (manufactured by Reichert) capable of measuring 0.0254 cm. The measurement is taken from the edge of the PVC to the scored edge of the lauan substrate. An average movement greater than 0.0254 cm is a failure.

Peel Adhesion—a 15.24×15.24 cm PVC sheet is laminated to lauan using a #60 rod and allowed to cure for seven days. Panels are cut to a 2.54×15.24 cm sample. The panels are peeled at the 180° angle and reported as N/m. The performance criteria is $0.53 \times 10^{-3}$ N/m.

In the following examples, Airflex 465 PVOH stabilized VAE copolymer emulsion from Air Products and Chemicals, Inc. was used. The emulsion comprised 66% solids and the copolymer had Tg of −5° C.

EXAMPLE 1

This example shows the preparation of a suitable UA copolymer dispersion using the ingredients in Table 1.

TABLE 1

|    |                          | Parts by Wt. |
|----|--------------------------|--------------|
| 1. | Formrez 55–56[a]         | 19.66        |
| 2. | Desmodur W[b]            | 8.63         |
| 3. | 10% DABCO T-12[c]        | 0.07         |
| 4. | N-methylpyrrolidone      | 2.36         |
| 5. | Dimethylolpropionic acid | 1.39         |
| 6. | N-methylpyrrolidone      | 4.48         |
| 7. | Butyl acrylate           | 9.88         |
| 8. | Hexanediol acrylate      | 0.05         |
| 9. | Triethylamine            | 1.05         |
| 10.| Water                    | 49.86        |
| 11.| Ethylenediamine          | 0.66         |
| 12.| N-methylpyrrolidone      | 0.47         |
| 13.| Vazo 64[d]               | 0.05         |
| 14.| Water                    | 1.34         |

[a]Poly(neopentyl adipate) MW-2000 from Witco Chemical
[b]Dicyclohexylmethane-4,4'-diisocyanate from Miles
[c]Dibutyltin dilaurate from Air Products and Chemicals, Inc.
[d]AIBN from DuPont Into a clean, dry reactor equipped with heating, cooling, stirring and a nitrogen blanket capability was charged polyester polyol (1) followed by the aliphatic diisocyanate (2) and the tin catalyst (3). With agitation this reaction mixture was brought to 94° C. and held for 0.5 hours. At this point, N-methylpyrrolidone (4) solvent was added followed by titration for percent NCO (theoretical NCO=11.64). When the NCO value was met, acid diol (5) powder was added followed by a solvent (6) and the reaction maintained at 94° C. for 2.5 hours. The mixture was cooled to 25° C. while adding butyl acrylate (7) followed by diacrylate (8). To the prepolymer-monomer solution at 25° C. was added triethylamine (9) with agitation to dissolve.

A second reactor was charged with distilled water (10) under nitrogen blanket and held at 25° C. The Vazo 64 catalyst (13) was dissolved in solvent (12). The water was agitated and the prepolymer-monomer solution was added at a rate of 6.7% of the prepolymer solution per minute. The Vazo 64 catalyst solution was slowly charged and mixed for five minutes. Diamine (11) was dissolved in water (14) and added immediately after the initiator. The dispersion was heated to 60° to 65° C., allowed to exotherm to 75° C. and maintained until the monomers were less than 1,000 ppm.

The resulting aqueous UA polymer dispersion typically has a solids content of about 40% and a pH of about 7.5 to 8.5. The UA polymer had a 100% tensile modulus of 560 psi (3.86 MPa) and an elongation of 675%.

EXAMPLE 2

In this example, various ratios of Airflex 465 VAE copolymer emulsion and the UA polymer dispersion of Example 1 were evaluated for creep resistance of a PVC to cloth laminate.

TABLE 2

| Adhesive Comp. | VAE/UA (dry wt) | °C. | Static Weight (g) | Creep (mm/min) |
|---|---|---|---|---|
| 3 | 100/0 | 76 | 100 | 27.7 |
|   |       | 76 | 500 | 132.0 |
|   |       | 96 | 100 | 46.8 |
|   |       | 96 | 500 | 197 |
|   |       |    |     | Average 100.9 |
| 4 | 95/5  | 76 | 100 | 8.9 |
|   |       | 76 | 500 | 96.2 |
|   |       | 96 | 100 | 18.9 |
|   |       | 96 | 500 | 135.0 |
|   |       |    |     | Average 82.2 |
| 5 | 90/10 | 76 | 100 | 3.7 |
|   |       | 76 | 500 | 41.5 |
|   |       | 96 | 100 | 7.2 |
|   |       | 96 | 500 | 82.2 |
|   |       |    |     | Average 33.7 |
| 6 | 50/50 | 76 | 100 | 8.9 |
|   |       | 76 | 500 | 40.6 |
|   |       | 96 | 100 | 12.1 |
|   |       | 96 | 500 | 77.2 |
|   |       |    |     | Average 34.7 |
| 7 | 0/100 | 76 | 100 | 3.8 |
|   |       | 76 | 500 | 48.2 |
|   |       | 96 | 100 | 7.4 |
|   |       | 96 | 500 | 70.6 |
|   |       |    |     | Average 32.5 |

The creep results (mm/min) of the PVC to cloth laminate show the optimal adhesion at levels ranging from 5 to 100 wt % UA polymer. However, Example 3 for PVC to lauan laminates shows optimal levels of UA polymer ranging from about 10 to 50 wt %.

EXAMPLE 3

In this example, adhesive compositions 3 and 5–7 comprising Airflex 465 VAE emulsion and the UA polymer dispersion of Example 1 were tested for creep of PVC to lauan laminate.

TABLE 3

| Adhesive Composition | VAE/UA (dry wt) | Creep (mm/min avg.) |
|---|---|---|
| 3 | 100/0 | 11.9 |
| 5 | 90/10 | 7.3 |
| 6 | 50/50 | 7.3 |
| 7 | 0/100 | 11.8 |

The optimum adhesion of the PVC to lauan is in the range of 10–50% UA polymer in the VAE copolymer emulsion. Further modification of the VAE emulsion beyond the 50% UA level appears to lower creep resistance performance.

EXAMPLE 4

In this example, the urethane/acrylic ratio of the UA polymer was varied. In each instance, Airflex 465 VAE copolymer emulsion and the UA polymer dispersion were blended at 90:10 ratio (dry weight). Adhesive composition 5 used the Example 1 UA polymer dispersion having a polyurethane/acrylic polymer wt ratio of 75/25 and an NCO/OH ratio of 3.25/1 while adhesive compositions 8A–8C used UA polymer dispersions prepared following the procedure of Example 1 but with the polyurethane/acrylic polymer wt ratio being 50/50 and the NCO/OH ratios as shown in Table 4A. In Example 8C acrylic component of the UA polymer comprised butyl acrylate and styrene in a 35/65 wt ratio.

TABLE 4A

| Adhesive Composition | Urethane/Butyl-acrylate | NCO/OH | Creep (mm/min) | | | | |
|---|---|---|---|---|---|---|---|
|   |   |   | 76° C./ 100 g | 76° C./ 500 g | 96° C./ 100 g | 96° C./ 500 g | Avg. |
| 5  | 75/25 | 3.25/1 | 3.7  | 41.5  | 7.2   | 82.2  | 33.7 |
| 8A | 50/50 | 3.15/1 | 6.2  | 53.0  | 10.0  | 86.5  | 38.9 |
| 8B | 50/50 | 6.7/1  | 22.4 | 194.4 | 36.2  | 314.2 | 141.8 |
| 8C | 50/50 | 6.7/1  | 37.6 | 78.2  | 135.9 | 176.5 | 107.0 |

TABLE 4B

| Adhesive Composition | Urethane/Butyl-acrylate | NCO/OH | 100% Tensile Modulus (N/m$^2$) UA Polymer | % Elongation UA Polymer |
|---|---|---|---|---|
| 5  | 75/25 | 3.25/1 | 3.86  | 675 |
| 8A | 50/50 | 3.15/1 | 1.72  | 540 |
| 8B | 50/50 | 6.7/1  | 9.59  | 230 |
| 8C | 50/50 | 6.7/1  | 20.6  | 220 |

The data in Tables 4A and 4B show adhesive composition 8A had relatively good creep performance at the 50/50 urethane/acrylic ratio compared to the preferred adhesive composition 5. Adhesive compositions 8B and 8C, which showed poorer creep resistance than adhesive composition 5, had 100% tensile modulus and % elongation values outside of the desired values of <10.34 N/m$^2$ and >500%, respectively.

EXAMPLE 5

This example shows the data for adhesive compositions 3 and 5 in the vinyl shrinkage and 45° lap shear tests. The UA containing adhesive composition 5 passed both tests.

TABLE 5

| Adhesive Composition | VAE/UA (dry wt) | Cross-Hatch PVC Shrinkage (93° C.) | 45° Lap Shear 1.8 kg; 93° C. |
|---|---|---|---|
| 3 | 100/0 | 0.076 cm  | fail; 100% delamination |
| 5 | 90/10 | 0.0076 cm | pass; 5% delamination |

EXAMPLE 6

In this example, VAE/UA adhesive compositions containing 10 dry weight % UA polymer were blended with various amounts of an aliphatic polyisocyanate (Desmodur DA). The VAE polymer emulsion was Airflex 465 emulsion and the UA polymer dispersion was that of Example 1. The superiority of the UA containing composition is readily evident.

TABLE 6

| Adhesive Composition | VAE/UA/NCO (dry wt) | Cross-Hatch PVC Shrinkage (93° C.) |
|---|---|---|
| 9  | 100/0/0    | 0.076 cm |
| 10 | 100/0/5    | 0.015 cm |
| 11 | 100/0/7.7  | 0.015 cm |
| 12 | 90/10/0    | 0.033 cm |
| 13 | 90/10/5    | 0.003 cm |
| 14 | 90/10/7.7  | 0.0005 cm |

EXAMPLE 7

In this example, a PVOH stabilized VAE copolymer emulsion at 55% solids (Airflex 400 emulsion) was compared to the PVOH stabilized VAE copolymer emulsion at 664 solids (Airflex 66% emulsion). The VAE emulsions were compared in combination with the Example 1 UA polymer dispersion.

TABLE 7

| Adhesive Comp. | A-464/ A-400/ Ex 1 UA | Creep (mm/min) | | | | |
|---|---|---|---|---|---|---|
| | | 76° C./ 100 g | 76° C./ 500 g | 96° C./ 100 g | 96° C./ 500 g | Avg. |
| 4 | 95/0/5 | 9.8 | 87.4 | 16.8 | 149.9 | 66.0 |
| 5 | 95/0/10 | 3.7 | 41.5 | 7.2 | 82.2 | 33.7 |
| 15 | 0/95/5 | 16.8 | 149.9 | 28.8 | 257.2 | 113.2 |

The data in Table 7 shows that based on the PVC to cloth creep results, the Airflex 465 VAE emulsion was superior to the Airflex 400 VAE emulsion.

EXAMPLE 8

This example compares the performance of Desmodur DA aliphatic polyisocyanate and PBA 2236LX aromatic isocyanate in various adhesive compositions.

TABLE 8

| Adhesive Comp. | VAE/UA (dry wt) | NCO Material | NCO (pph)[a] | Cross-Hatch Shrinkage 93° C. | | Peel Adhesion[d] × 10⁻³ N/m |
|---|---|---|---|---|---|---|
| | | | | A[b] | B[c] | |
| 3 | 100/0 | — | 0 | 0.011 cm | 0.06 cm | 0.75 |
| 17 | 100/0 | PBA 2236LX | 5 | 0.005 cm | 0.01 cm | 1.31 |
| 18 | 100/0 | Desmodur DA | 5 | — | 0.015 cm | — |
| 19 | 100/0 | Desmodur DA | 7.7 | — | 0.015 cm | 1.16 |
| 5 | 90/10 | — | 0 | 0.008 cm | 0.02 cm | 0.81 |
| 20 | 90/10 | PBA 2236LX | 5 | 0.003 cm | 0.008 cm | 1.14 |
| 21 | 90/10 | Desmodur DA | 5 | 0.003 cm | 0.008 cm | — |
| 22 | 90/10 | Desmodur DA | 7.7 | 0.0005 cm | 0.0023 cm | 1.40 |

[a]parts per hundred parts VAE/UA
[b]woodgrain PVC to lauan
[c]white ceiling PVC to lauan
[d]standard PVC to lauan The data in Table 8 shows that both the aliphatic polyisocyanate and the aromatic polyisocyanate provided improved results when added to the VAE/UA adhesive composition.

EXAMPLE 9

In this example, the pot lives of various VAE/UA adhesive compositions containing an aromatic or an aliphatic polyisocyanate were evaluated.

TABLE 9

| Adhesive Comp. | VAE/UA (dry wt) | NCO | (pph) | Viscosity (cps) | | | |
|---|---|---|---|---|---|---|---|
| | | | | Initial | 1 hr | 3 hr | 6 hr |
| 17 | 100/0 | PBA 2236LX | (5) | 6250 | 9850 | 27000 | 28000 |
| 20 | 90/10 | PBA 2236LX | (5) | 4910 | 41800 | GEL | GEL |
| 21 | 90/10 | Desmodur DA | (5) | 4600 | 5100 | 6120 | 10300 |
| 22 | 90/10 | Desmodur DA | (7.7) | 4940 | 5440 | 7450 | 16250 |

The data shows that the PBA 2236LX aromatic polyisocyanate in the VAE/UA adhesive composition had a pot life that was too short for practical field applications. However, Desmodur DA aliphatic polyisocyanate had excellent pot life characteristics in the same VAE/UA adhesive composition.

STATEMENT OF INDUSTRIAL APPLICATION

The present invention provides a PVC laminating adhesive composition for the mobile home furniture and paneling vinyl laminating markets.

We claim:

1. A vinyl laminating adhesive composition consisting essentially of
   (a) 50 to 95 wt % aqueous polyvinyl alcohol stabilized vinyl acetate/ethylene copolymer emulsion, and
   (b) 5 to 50 wt % aqueous polyurethane-acrylic polymer dispersion, the polyurethane-acrylic polymer having a 100% tensile modulus of $<10.34$ N/m² and an elongation of $>500\%$,
   and optionally,
   (c) 3 to 15 wt % polyisocyanate, the wt %'s based on combined (a) and (b) solids.

2. The composition of claim 1 which consisting essentially of
   (a) 70 to 95 wt % aqueous polyvinyl alcohol stabilized vinyl acetate/ethylene copolymer emulsion, and
   (b) 5 to 30 wt % aqueous polyurethane-acrylic polymer dispersion.

3. The composition of claim 1 in which the polyisocyanate is 5–10 wt %.

4. The composition of claim 1 in which the polyurethane-acrylic polymer dispersion is prepared by reacting a polyester polyol, an aliphatic polyisocyanate and 2,2-dimethylolpropionic acid to form the polyurethane and polymerizing butyl acrylate in the presence of the polyurethane.

5. A vinyl laminating adhesive composition consisting essentially of
   (a) 70 to 95 wt % aqueous polyvinyl alcohol stabilized vinyl acetate/ethylene copolymer emulsion which is 60–67 wt % solids, the copolymer being 70–85 wt % vinyl acetate and 15–30 wt % ethylene, and
   (b) 5 to 30 wt % aqueous polyurethane-acrylic polymer dispersion which is 20–60 wt % solids, the polymer having a 100% tensile modulus of <10.34 N/m² and an elongation of >500%, and optionally,
   (c) 3 to 15 wt % polyisocyanate, the wt %'s based on combined (a) and (b) solids.

6. The composition of claim 5 in which the polyisocyanate is 5–10 wt %.

7. The composition of claim 5 in which the polyurethane-acrylic polymer dispersion is prepared by reacting a polyester polyol, an aliphatic polyisocyanate and 2,2-dimethylolpropionic acid to form the polyurethane and polymerizing butyl acrylate in the presence of the polyurethane.

8. The composition of claim 5 in which the polyurethane-acrylic polymer has a 100% tensile modulus of <6.9 N/m² and an elongation of >600%.

9. The composition of claim 7 in which the polyurethane-acrylic polymer has a 100% tensile modulus of <6.9 N/m² and an elongation of >600%.

10. In a vinyl laminate comprising polyvinyl chloride film bonded to a substrate with an adhesive composition, the improvement which comprises an adhesive composition consisting essentially of
    (a) 50 to 90 wt % aqueous polyvinyl alcohol stabilized vinyl acetate/ethylene copolymer emulsion,
    (b) 5 to 50 wt % aqueous polyurethane-acrylic polymer dispersion, the polyurethane-acrylic polymer having a 100% tensile modulus of <10.34 N/m² and an elongation of >500%, and optionally,
    (c) 3 to 15 wt % polyisocyanate,
    the wt %'s based on combined (a) and (b) solids.

11. The laminate of claim 10 in which the adhesive composition consisting essentially of
    (a) 70 to 95 wt % aqueous polyvinyl alcohol stabilized vinyl acetate/ethylene copolymer emulsion, and
    (b) 5 to 30 wt % aqueous polyurethane-acrylic polymer dispersion.

12. The laminate of claim 10 in which the adhesive composition has 5–10 wt % polyisocyanate.

13. The laminate of claim 10 in which the polyurethane-acrylic polymer dispersion is prepared by reacting a polyester polyol, an aliphatic polyisocyanate and 2,2-dimethylolpropionic acid to form the polyurethane and polymerizing butyl acrylate in the presence of the polyurethane.

14. In a vinyl laminate comprising polyvinyl chloride film bonded to a substrate with an adhesive composition, the improvement which comprises an adhesive composition consisting essentially of
    (a) 70 to 95 wt % aqueous polyvinyl alcohol stabilized vinyl acetate/ethylene copolymer emulsion which is 60–67 wt % solids, the copolymer being 70–85 wt % vinyl acetate and 15–30 wt % ethylene, and
    (b) 5 to 30 wt % aqueous polyurethane-acrylic polymer dispersion which is 20–60 wt % solids, the polymer having a 100% tensile modulus of <10.34 N/m² and an elongation of >500%, and optionally,
    (c) 3 to 15 wt % polyisocyanate,
    the wt %'s based on combined (a) and (b) solids.

15. The laminate of claim 14 in which the adhesive composition has 5–10 wt % polyisocyanate.

16. The laminate of claim 14 in which the polyurethane-acrylic polymer dispersion is prepared by reacting a polyester polyol, an aliphatic polyisocyanate and 2,2-dimethylolpropionic acid to form the polyurethane and polymerizing butyl acrylate in the presence of the polyurethane.

17. The laminate of claim 14 in which the polyurethane-acrylic polymer has a 100% tensile modulus of <6.9 N/m² and an elongation of >600%.

18. The laminate of claim 16 in which the polyurethane-acrylic polymer has a 100% tensile modulus of <6.9 N/m² and an elongation of >600%.

* * * * *